United States Patent Office 2,914,542
Patented Nov. 24, 1959

2,914,542

REACTION PRODUCT OF 1-AMINOANTHRAQUINONE AND o-PHTHALYL CHLORIDE

David I. Randall, New Vernon, and John Taras, Alpha, N.J., assignors to General Aniline & Film Corporation, New York, N.Y., a corporation of Delaware No Drawing. Application September 20, 1956
Serial No. 610,896

11 Claims. (Cl. 260—377)

This invention relates to the production of novel pigment compositions by reaction of 1-aminoanthraquinone and o-phthalyl chloride and more particularly to such pigment compositions having improved shades and properties useful in spin dyeing.

The two main objectives of spin dyeing as compared to surface dyeing are:
(1) To obtain better fastness properties.
(2) To render the dyeing process more economical.

The color pigment chosen for spin dyeing in addition to being insoluble in water and ordinary organic solvents, must satisfy several stringent requirements. The degree of the color pigment dispersion as well as its stability as regards storage of such dispersions are highly critical. Important too is the ease with which the viscose or other synthetic fiber or film is colored by the injection method as well as the ease of operation of the colored material in the continuous dyeing machine. The colored products must also have fastness properties required by normal consumer use.

Today the following yellow pigments are used to a considerable extent by the rayon industry.
(1) Hansa Yellows—In general the Hansas are lacking in fastness to heat and organic solvents.
(2) Benzidine Yellows—These are of only limited fastness to light.

Due to the limitations of the yellow colors now in use, it is apparent that vast improvements must be made pigmentwise to enable the spin dyeing industry to claim superior fastness.

It is well known that the reaction of one mole of o-phthalyl chloride and two moles of 1-aminoanthraquinone yields a yellow pigment which is old in the literature. This known reaction proceeds as follows:

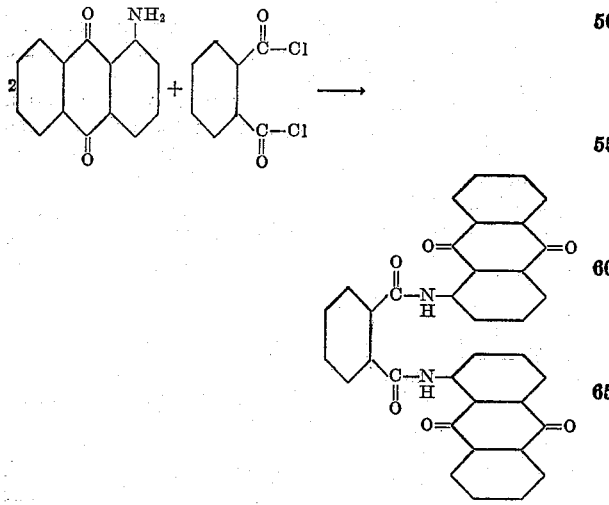

This simple diamide pigment has failed to satisfy the requirements of spin dyeing of rayon and cellulose acetate chiefly due to its rather red and somewhat dull shade despite its excellent lightfastness.

One object of the instant invention is the preparation of a greenish yellow, brighter pigment composition from the relatively inexpensive materials 1-aminoanthraquinone and o-phthalyl chloride. A further object is to prepare a greener yellow, bright pigment possessing the excellent lightfastness of the aforementioned reddish yellow pigment.

The attainment of the above objects is made possible by the instant invention which is based upon the discovery that by using an amount of o-phthalyl chloride in excess of that theoretically required by the above-described reaction, a pigment composition is obtained which contains a bright greenish yellow component of unknown constitution in sufficient amount to produce a more desirable greenish shade of yellow than that of the above-described known reaction product. This bright greenish yellow component is characterized by a pronounced fluorescence when exposed to ultraviolet light. Significantly, this fluorescence is lacking in the reddish yellow shade of the known simple diamide reaction product. The amount of the greenish yellow component will vary according to the proportion of reactants and the conditions of the reaction, and may range from as little as about 5% to as high as 25 to 30%, with a preferred range of 10 to 25%, by weight of the total composition.

The light fast properties of the pigment compositions of the instant invention may be even further improved by after-treatment of such compositions with an oxidizing agent. This treatment results in a product which maintains its bright greenish shade and at the same time imparts to the product improved light fast properties. Surprisingly, these pigment compositions after subjection to this oxidizing treatment still exhibit a strong fluorescence under ultraviolet radiation.

It might be supposed that due to the large excess of phthalyl chloride used, a large amount of a substituted phthalamic acid chloride would be formed which is well known to be quite soluble in hot aqueous pyridine. The pigment compositions of this invention, however, are not soluble in such solvent and therefore we do not believe the fluorescent dye component in our composition to be a phthalamic acid derivative whose formula is (A) below. Nor is it the substituted phthalimido derivative (B) resulting from a ring closure of the substituted phthalamic acid (A). The phthalimido derivative (B) has been synthesized and is a dull, weak and valueless pigment.

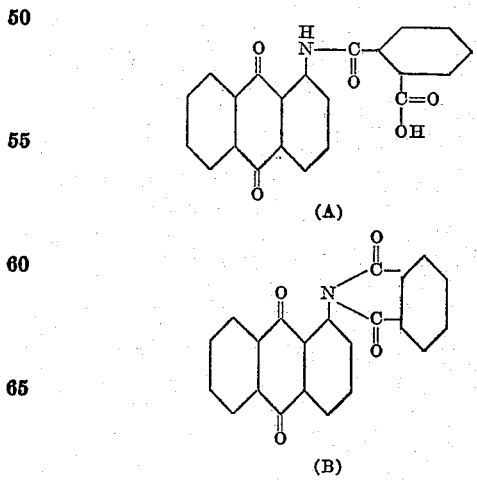

The process of the instant invention is carried out in a manner well known in the art for producing the known phthalyl diamide, the essential difference therefrom residing in the use of an excess of o-phthalyl chloride. More specifically, the process of the instant invention comprises reacting 1 mole of 1-aminoanthraquinone with from 0.6 to 2 moles, preferably 1 mole, of o-phthalyl chloride at a temperature of about 150 to 210° C., preferably 175 to 180° C., in an inert organic diluent. The inert organic diluent must be liquid under the conditions of reaction, and is preferably a solvent for the reactants employed herein. As preferred diluents, there may be mentioned dichlorobenzene and trichlorobenzene. However, other diluents may also be employed as for example nitrobenzene, xylene and similar solvents known in the art. Desirably, the diluent besides being a solvent for the reactants, is a non-solvent for the reaction products whereby separation from the reaction medium is facilitated. Inclusion of a small amount of thionyl chloride is sometimes desirable to reconvert non-reactive carboxylic compounds (e.g. hydrolyzed o-phthalyl chloride) back to the reactive acid chloride. When used, amounts of about 2 to 10% of thionyl chloride by weight of the acid chloride are preferred. It should of course be noted that, as generally recognized in the art, brighter and stronger products are obtained with purer reactants. Thus, better results in this respect are obtained by using in the reaction 1-aminoanthraquinone previously purified, as by sublimation.

The completion of the reaction is indicated by cessation of the evolution of HCl gas. At this point, it is preferred to pass dry air through the reaction mass to remove the HCl gas, after which the reaction mass is cooled to crystalize out the desired reaction product which is then separated, as by filtering, and desirably washed.

As pointed out above, further improved results are obtained, particularly in the case of reactions carried out with amounts of o-phthalyl chloride within the upper part of the stated range of proportions, by treating the pigment compositions as obtained by the above-described reaction with an oxidizing agent. This treatment is preferably carried out while the pigment composition is dispersed in an aqueous medium in sufficient concentration to yield a finely divided aqueous slurry. While sodium hypochlorite is the preferred oxidizing agent, others may be employed such as sodium dichromate, sodium nitrate, and mixtures of such agents and the like to obtain similarly improved results with respect to light fastness. Generally, about 3 to 5 parts of 100% sodium hypochlorite per part of pigment are sufficient, other oxidizing agents being used in equivalent proportions, e.g. about ½ to 1 part of sodium dichromate per part of pigment.

The following examples, in which parts are by weight unless otherwise indicated are illustrative of the instant invention and are not to be regarded as limitative.

EXAMPLE 1

*Condensation.*—A flask charged with 450 parts 1-aminoanthraquinone (2.01 moles) previously purified by sublimation, 5000 parts dichlorobenzene, 8 parts thionyl chloride, and 425 parts o-phthalyl chloride (2.09 moles).

The reaction mass is heated to 170° C. in three to four hours while agitating briskly. The reaction mass thickens as the temperature approaches 95–105° C. At this stage the agitation is slowed down and the heating continued with caution. As the temperature is increased the reaction becomes fluid and the agitation can be increased. Finally the reaction mass is maintained at 175–180° C. for two to three hours. Air is then passed through the reaction mass to remove the HCl gas, after which the reaction mass is cooled to 40–50° C. The crystalline material which separates is filtered and washed first with dichlorobenzene. It is washed finally with acetone to remove the organic solvent. The final washings are practically free of color. The yellow pigment composition is dried at 80–85° C. It fluoresces under ultraviolet light.

*Dispersion.*—A one gallon Abbé Mill is charged with 600 parts above yellow pigment composition, 750 parts Tamol NNO (sodium naphthalene formaldehyde sulfonate) and 1983 parts water.

The mill is charged with ¾" flint pebbles. Enough pebbles are used so that there is a layer of about ½" to 1" of pebbles covering the surface of the charge.

The charge is milled at a rate of 72 revolutions per minute. After ball milling one hundred hours, the particle size has been reduced to a distribution of 80–85% of the total having a particle size of less than 1 micron and 15–20% having a particle size of 1–3 microns.

The pigment is made into a uniform paste. It is applied on wallpaper by brushing on a formulation consisting of pigment, cellulose gum, china clay and water. A bright greenish yellow shade is obtained which is fluorescent under ultraviolet light. Its lightfastness is excellent when tested by exposure in the Fadeometer.

EXAMPLE 2

This example is for comparative purposes, illustrating prior art practice.

A flask is charged with 450 parts 1-aminoanthraquinone (2.01 moles) previously purified by sublimation, 5000 parts dichlorobenzene, 6 parts thionyl chloride and 200 parts o-phthalyl chloride (0.98 mole).

The reaction mass is heated to 170° C. in three hours while agitating briskly. The reaction mass thickens as the temperature approaches 90–110° C. At this stage the agitation is slowed down and the heating is continued with caution. As the temperature is increased the reaction becomes fluid and the agitation can be increased. Finally the reaction mass is maintained at 175–180° C. for two to three hours. Air is then passed through the reaction mixture to remove the HCl gas, after which the reaction mass is cooled to 40–50° C. The product is isolated as described in Example 1.

Since the product cannot be dispersed by ordinary acid pasting methods because of the ease with which the diamide is hydrolyzed, the dispersion is accomplished as in Example 1 by ball milling the pigment.

A uniform paste of this dispersion is applied on wallpaper by brushing on a formulation consisting of pigment, cellulose gum, china clay and water. A reddish yellow somewhat dull shade is obtained.

EXAMPLE 3

109 parts of the yellow pigment composition prepared as in Example 1 ("Condensation"), 109 parts Tamol NNO, and 500 parts water are ball milled with ¾" flint pebbles for 150 hours. 643 parts of the above milled paste and 600 parts water are charged into a 3 liter flask and heated to 90–95° C. 1450 parts of a 13% sodium hypochlorite solution are added during a period of eight hours at 90–95° C.

The yellow pigment is filtered and washed free of alkali and chloride ions. The filtrations and washing rates are rapid.

A sample of the pigment presscake is made into a paste and applied to wallpaper as in Example 1. The shade of the wallpaper dyeing is somewhat greener and brighter than that of the shade obtained in Example 1. It has excellent lightfastness.

A part of the pigment presscake is dried at 80–85° C. A soft, bright, greenish yellow powder is obtained which is useful in cellulose acetate spin dyeing.

EXAMPLE 4

A flask is charged with 250 parts dichlorobenzene, 1 part thionyl chloride, 22.3 parts 1-aminoanthraquinone (0.1 mole) previously purified by sublimation, and 21.0 parts o-phthalyl chloride (0.1 mole).

The reaction mass is heated carefully to 175–180° C. and held at this temperature for two hours. The flask is cooled to 50–60° C. and the contents filtered. The cake is washed with dichlorobenzene and then with acetone. The product is insoluble in hot acetone, cold pyridine and dichlorobenzene. Solution in sulfuric acid produces 1-aminoanthraquinone due to hydrolysis.

Applied to wallpaper the product is greener and brighter than the product described in Example 2.

EXAMPLE 5

A flask is charged with 250 parts dichlorobenzene, 1 part thionyl chloride, 22.3 parts 1-aminoanthraquinone (0.1 mole) previously purified by sublimation and 12.5 parts o-phthalyl chloride (0.061 mole).

The charge is heated to 170° C. in two hours and held at 175–180° C. for ½ hour. The product is isolated and dispersed as in Example 1. Wallpaper brushouts yield a shade noticeably greener and brighter than the product described in Example 2.

Treatment of the dispersed paste with sodium hypochlorite solution by a procedure similar to that described in Example 3 yields a product having excellent lightfastness when applied to wallpaper.

EXAMPLE 6

The procedure is the same as that described in Example 5 but the amount of o-phthalyl chloride is increased to 15 parts (0.074 mole).

The shade of the pigment is intermediate between that of the products of Example 1 and Example 5. The lightfastness of this pigment is excellent when the dispersed pigment is treated with sodium hypochlorite solution as described in Example 3.

EXAMPLE 7

100 parts of the yellow pigment obtained as described in Example 6, 100 parts water, 10 parts 96% $H_2SO_4$ are heated to 90–95° C. and 6 parts sodium dichromate are added in four hours. After isolation of the pigment by filtration, the pigment paste is applied to wallpaper. A bright greenish yellow shade is obtained. Its lightfastness is excellent.

EXAMPLE 8

A flask is charged with 250 parts trichlorobenzene, 2 parts thionyl chloride, 22.3 parts 1-aminoanthraquinone, (0.1 mole) previously purified by sublimation and 15 parts o-phthalyl chloride (0.074 mole).

The reaction temperature is gradually raised to 205° C. during a period of three hours. The flask is held at 205–210° C. for one hour. The reaction product is isolated as described in Example 1. After dispersion by ball milling, the product is applied to wallpaper. The shade of the dyeing is a bright greenish yellow, much greener than the dyeing obtained in Example 2. The lightfastness is excellent.

Treatment of the pigment with sodium hypochlorite solution yields a brighter and greener pigment.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

We claim:

1. A process comprising reacting 1 mole of 1-aminoanthraquinone with from 0.6 to 2 moles of o-phthalyl chloride at a temperature of about 150 to 210° C. in an inert organic liquid diluent, and then separating the resulting reaction product from the reaction mixture.

2. A process as defined in claim 1 wherein about 1 mole of o-phthalyl chloride is reacted with about 1 mole of 1-aminoanthraquinone.

3. A process as defined in claim 1 carried out at a temperature of about 175 to 180° C.

4. A process as defined in claim 1 wherein the diluent is dichlorobenzene.

5. A process as defined in claim 1 wherein the diluent is trichlorobenzene.

6. A process as defined in claim 1 carried out in the presence of thionyl chloride.

7. A process comprising reacting 1 mole of 1-aminoanthraquinone with from 0.6 to 2 moles of o-phthalyl chloride at a temperature of about 150 to 210° C. in an inert organic liquid diluent, separating the resulting reaction product from the reaction mixture, and then treating said reaction product with an oxidizing agent.

8. A process as defined in claim 7 wherein said oxidizing agent is sodium hypochlorite.

9. A process as defined in claim 7 wherein said oxidizing agent is sodium dichromate.

10. A pigment composition produced in accordance with the process of claim 1.

11. A pigment composition produced in accordance with the process of claim 7.

References Cited in the file of this patent

UNITED STATES PATENTS

| | | |
|---|---|---|
| 2,123,375 | Mieg et al. | July 12, 1938 |
| 2,727,044 | Pizzarello et al. | Dec. 13, 1955 |
| 2,763,667 | Moergeli et al. | Sept. 18, 1956 |

OTHER REFERENCES

The Chem. of Synthetic Dyes, Venkataraman, Academic Press, New York, vol. II (1952), pgs. 884–885.